United States Patent
Hwang et al.

(10) Patent No.: US 8,220,136 B2
(45) Date of Patent: Jul. 17, 2012

(54) FORMING A PLANARIZED SURFACE FOR AT LEAST ONE BAR OF SLIDERS

(75) Inventors: Cherngye Hwang, San Jose, CA (US);
Jorge Goitia, San Jose, CA (US);
Kenneth L. Larson, Manteca, CA (US);
Dennis R. McKean, Milpitas, CA (US)

(73) Assignee: Hitachi Global Storage Technologies Netherlands B. V., Amsterdam (NL)

( * ) Notice: Subject to any disclaimer, the term of this patent is extended or adjusted under 35 U.S.C. 154(b) by 867 days.

(21) Appl. No.: 11/800,127

(22) Filed: May 3, 2007

(65) Prior Publication Data

US 2008/0273270 A1 Nov. 6, 2008

(51) Int. Cl.
*G11B 5/127* (2006.01)
*H04R 31/00* (2006.01)

(52) U.S. Cl. ............ 29/603.12; 29/603.11; 29/603.2; 29/737; 360/235.2; 360/235.8; 360/236.6

(58) Field of Classification Search ............ 29/737, 29/603.11, 603.12, 603.2; 360/235.2, 235.8, 360/236.6
See application file for complete search history.

(56) References Cited

U.S. PATENT DOCUMENTS

| | | | | | |
|---|---|---|---|---|---|
| 5,516,430 | A | * | 5/1996 | Hussinger | 216/36 |
| 5,648,136 | A | * | 7/1997 | Bird | 428/76 |
| 6,081,991 | A | * | 7/2000 | Tsunoda et al. | 29/603.08 |
| 7,191,508 | B2 | * | 3/2007 | Hwang et al. | 29/603.12 |
| 2004/0093719 | A1 | * | 5/2004 | Dai et al. | 29/603.12 |
| 2005/0235485 | A1 | | 10/2005 | Dai et al. | |
| 2005/0243469 | A1 | * | 11/2005 | Chaw et al. | 360/235.1 |
| 2006/0232886 | A1 | * | 10/2006 | Chang et al. | 360/235.8 |
| 2008/0078077 | A1 | * | 4/2008 | Lee et al. | 29/603.06 |
| 2010/0072581 | A1 | * | 3/2010 | Nakasaki et al. | 257/632 |

\* cited by examiner

*Primary Examiner* — Derris Banks
*Assistant Examiner* — Jeffrey T Carley

(57) ABSTRACT

A method for forming a planarized surface for at least one bar of sliders for utilization in a hard disk drive is disclosed. In general, at least one bar of sliders is placed on an adhesive layer. A single thermoplastic layer is then provided above the at least one bar of sliders. The single thermoplastic layer is then heated to a softening temperature such that the single thermoplastic layer will flow between the at least one bar of sliders. The single thermoplastic layer is then cooled to form a planarized surface of both said single thermoplastic layer and said at least one bar of sliders at said adhesive layer.

7 Claims, 7 Drawing Sheets

500

```
PLACES AT LEAST ONE ROW OF SLIDERS ON AN ADHESIVE LAYER.
502
         │
         ▼
PROVIDES A SINGLE THERMOPLASTIC LAYER ABOVE THE AT LEAST
ONE ROW OF SLIDERS.
504
         │
         ▼
HEATS THE SINGLE THERMOPLASTIC LAYER TO A SOFTENING
TEMPERATURE SUCH THAT THE SINGLE THERMOPLASTIC LAYER
WILL FLOW BETWEEN THE AT LEAST ONE ROW OF SLIDERS.
506
         │
         ▼
COOLS THE SINGLE THERMOPLASTIC LAYER TO FORM A PLANARIZED
SURFACE OF BOTH THE SINGLE THERMOPLASTIC LAYER AND THE AT
LEAST ONE ROW OF SLIDERS AT THE ADHESIVE LAYER.
508
```

FIG. 5

FORMING A PLANARIZED SURFACE FOR AT LEAST ONE BAR OF SLIDERS

TECHNICAL FIELD

This invention relates generally to the field of direct access storage devices and in particular to the planarization portion of the manufacturing process.

BACKGROUND ART

Direct access storage devices (DASDs) have become part of everyday life, and as such, the capability to manipulate and store larger amounts of data at greater speeds is expected. To meet these expectations, DASDs such as a hard disk drive (HDD) have undergone many changes.

The basic hard disk drive model resembles a phonograph. That is, the hard disk drive model includes a storage disk, or hard disk, that spins at a standard rotational speed. An actuator arm with a suspended slider is utilized to reach out over the disk. The arm carries a head assembly that has a magnetic read/write transducer, or head, for writing or reading information to or from a location on the disk. An air bearing surface (ABS) on the slider allows the slider to be flown very close to the surface of a disk. The complete head assembly, e.g., the suspension and head, is called a head gimbal assembly (HGA).

Data is recorded onto the surface of a disk in a pattern of concentric rings known as data tracks. One way to increase the amount of data that can be stored on a disk is to make each data track narrower so that the tracks can be placed closer together. But, as tracks are narrowed, the signal-to-noise ratio is worsened, making it more difficult to discern signals from the head. Signal-to-noise ratio can be improved by positioning the head closer to the disk surface. Thus, the height of the slider above the disk (referred to as fly height) can be an important parameter. Another important parameter is the distance between the bottom surface of the head and the bottom surface of the substrate to which the head is attached (referred to as pole tip recession). In general, as the spacing between the head and the disk surface is narrowed, it becomes more important to tightly control the flatness and uniformity of surfaces such as the ABS, in order to reduce the probability of contact between the head and a disk.

When forming the ABS on a slider, a planarization surface is needed. That is, the sliders are laid out on wafers and then cut into rows or bars. At the bar level, the ABS is formed on each slider. Since the bars are so small, a number of bars are often placed on an adhesive material and the spaces between the bars are filled with a flowable material to form a planarized surface upon which to work. However, with distances and tolerances measured in terms of nanometers, even minute deviations in the topography of the planarized surface can be very significant. For example, the utilization of some flowable materials will result in corners of the planarized surface pulling away from the bars during the cure process, or it may be extremely difficult to remove the flowable materials from the bars when the forming of the ABS is complete. Thus, there may be a great loss of yield based on curing, removal, and the like.

SUMMARY OF THE INVENTION

A method for forming a planarized surface for at least one bar of sliders for utilization in a hard disk drive is disclosed. In general, at least one bar of sliders is placed on an adhesive layer. A single thermoplastic layer is then provided above the at least one bar of sliders. The single thermoplastic layer is then heated to a softening temperature such that the single thermoplastic layer will flow between the at least one bar of sliders. The single thermoplastic layer is then cooled to form a planarized surface of both said single thermoplastic layer and said at least one bar of sliders at said adhesive layer.

BRIEF DESCRIPTION OF THE DRAWINGS

The accompanying drawings, which are incorporated in and form a part of this specification, illustrate embodiments of the invention and, together with the description, serve to explain the principles of the invention:

FIG. 5 is a flowchart illustrating one embodiment of a method for forming a planarized surface for at least one bar of sliders for utilization in a hard disk drive in accordance with one embodiment of the present invention.

DETAILED DESCRIPTION

Figure 1:
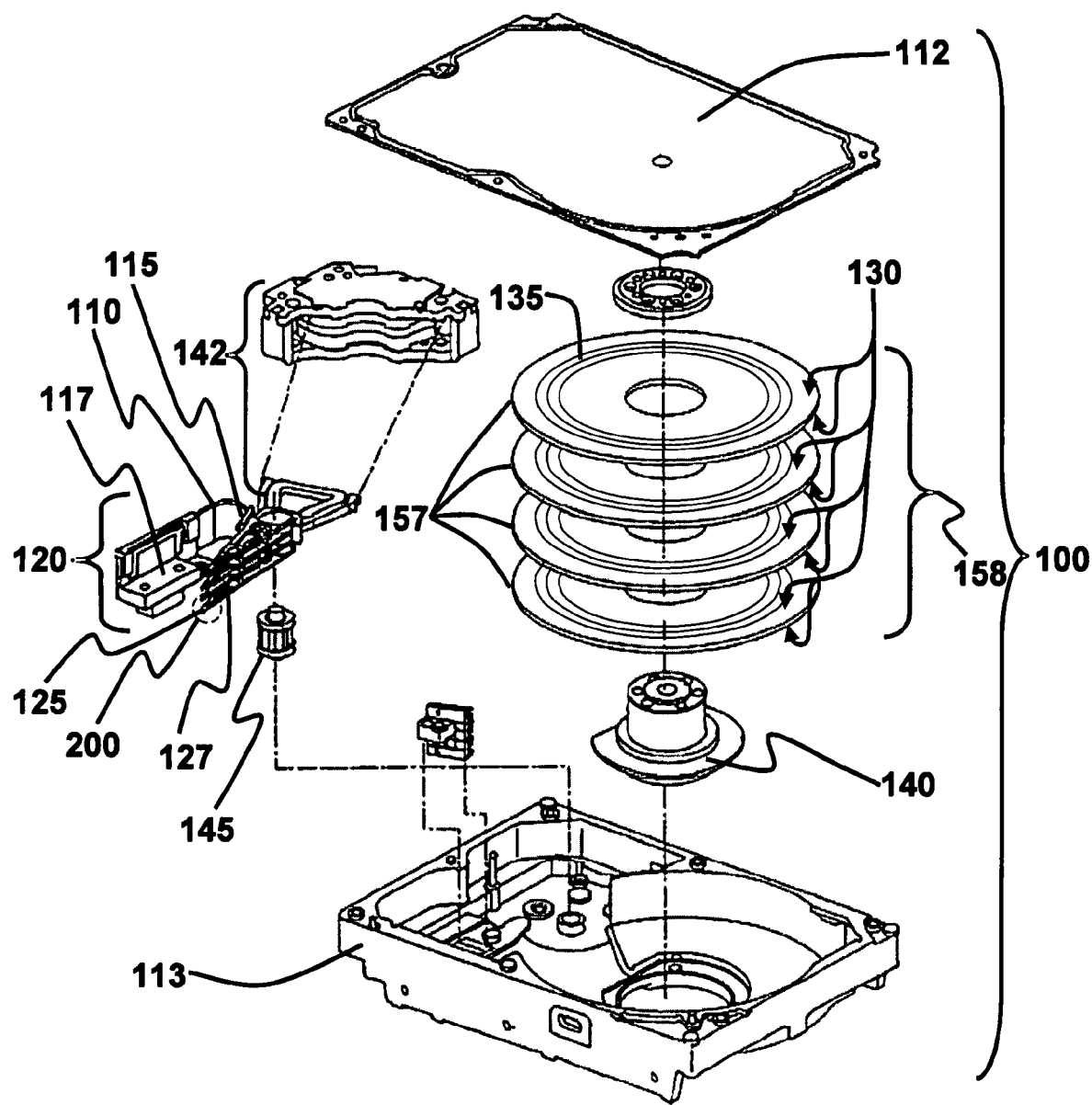
FIG. 1 is an isometric blow-apart of a hard disk drive in accordance with one embodiment of the present invention.

Reference will now be made in detail to the alternative embodiment(s) of the present invention. While the invention will be described in conjunction with the alternative embodiment(s), it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of embodiments of the present invention, numerous specific details are set forth in order to provide a thorough understanding of the present invention. However, it will be recognized by one of ordinary skill in the art that embodiments of the present invention may be practiced without these specific details. In other instances, well known methods, procedures, and components have not been described in detail as not to unnecessarily obscure aspects of the present invention.

The discussion will begin with a brief overview of a method for forming a planarized surface for at least one bar of sliders. The discussion will then focus on the details and implementation of a number of embodiments of the present invention.

Overview

The present technology describes embodiments of a system and a method for forming a planarized surface for at least one bar of sliders. In general, during the manufacturing process of small film structures, such as a slider portion of a hard disk drive (HDD), planarization is utilized to prepare the structures for etching.

Basically, after a wafer is cut into bars, the bars are placed on an adhesive layer with the side to be etched facing toward the adhesive layer. A single thermoplastic layer is then placed above the bars. The single thermoplastic layer is then heated to a first temperature until it begins to flow and fill in the space between the bars of film structure. Once the single thermoplastic layer fills in the space between the bars of film structure, the temperature is lowered back toward room temperature until the single thermoplastic layer begins to harden.

Once the single thermoplastic layer has hardened, the adhesive layer can be removed and a planarized surface of both the bars of film structure and the single thermoplastic layer is exposed. The bars of film structure can then be etched or otherwise shaped as desired. For example, in one embodiment, the bars of film structure include a plurality of sliders and the air bearing surface (ABS) of the slider can be formed. Moreover, after the formation of the ABS in the bars of film, the single thermoplastic layer is easily removed with the use of non-polar solvents.

In addition, because the single thermoplastic layer is soluble to non-polar solvents, the solvent used on the single thermoplastic layer will not adversely affect the bars of film or ABS thereon. Also, because the single thermoplastic layer is soluble, there is no need for soda blast or other types of aggressive cleaning of the bars of film. That is, the single thermoplastic layer is simply dissolved by the non-polar solvent.

For purposes of the present description, the term thermoplastic refers to a material that is plastic or deformable, melts to a liquid when heated and returns to a solid form at or above room temperature. Ethylene-vinyl acetate (EVA) is the copolymer of ethylene and vinyl acetate. In general, EVA is a copolymer that approaches elastomeric materials in softness and flexibility, yet can be processed like other thermoplastics.

Operation

With reference to FIG. 1, an isometric blow-apart of HDD 100 is shown in accordance with an embodiment of this invention. Base casting 113 provides coupling points for components and sub-assemblies such as disk stack 158, voice coil motor (VCM) 142, and actuator assembly 120. Disk stack 158 is coupled to base casting 113 by means of motor-hub assembly 140. Motor-hub assembly 140 will have at least one disk 157 coupled to it whereby disk 157 can rotate about an axis common to motor-hub assembly 140 and the center of disk 157. Disk 157 has at least one surface 130 upon which reside data tracks 135. Actuator assembly 120 comprises in part suspension 127, which suspends hard disk drive slider 125 next to disk surface 130, and connector 117, which conveys data between arm electronics (A/E) 115 and a host system wherein HDD 100 resides. Flex cable 110, which is part of actuator assembly 120, conveys data between connector 117 and A/E 115.

Actuator assembly 120 is coupled pivotally to base casting 113 by means of pivot bearing 145, whereby VCM 142 can move HDD slider 125 arcuately across data tracks 135. Upon assembly of actuator assembly 120, disk stack 158, VCM 142, and other components with base casting 113, cover 112 is coupled to base casting 113 to enclose these components and sub-assemblies into HDD 100.

Figure 2:
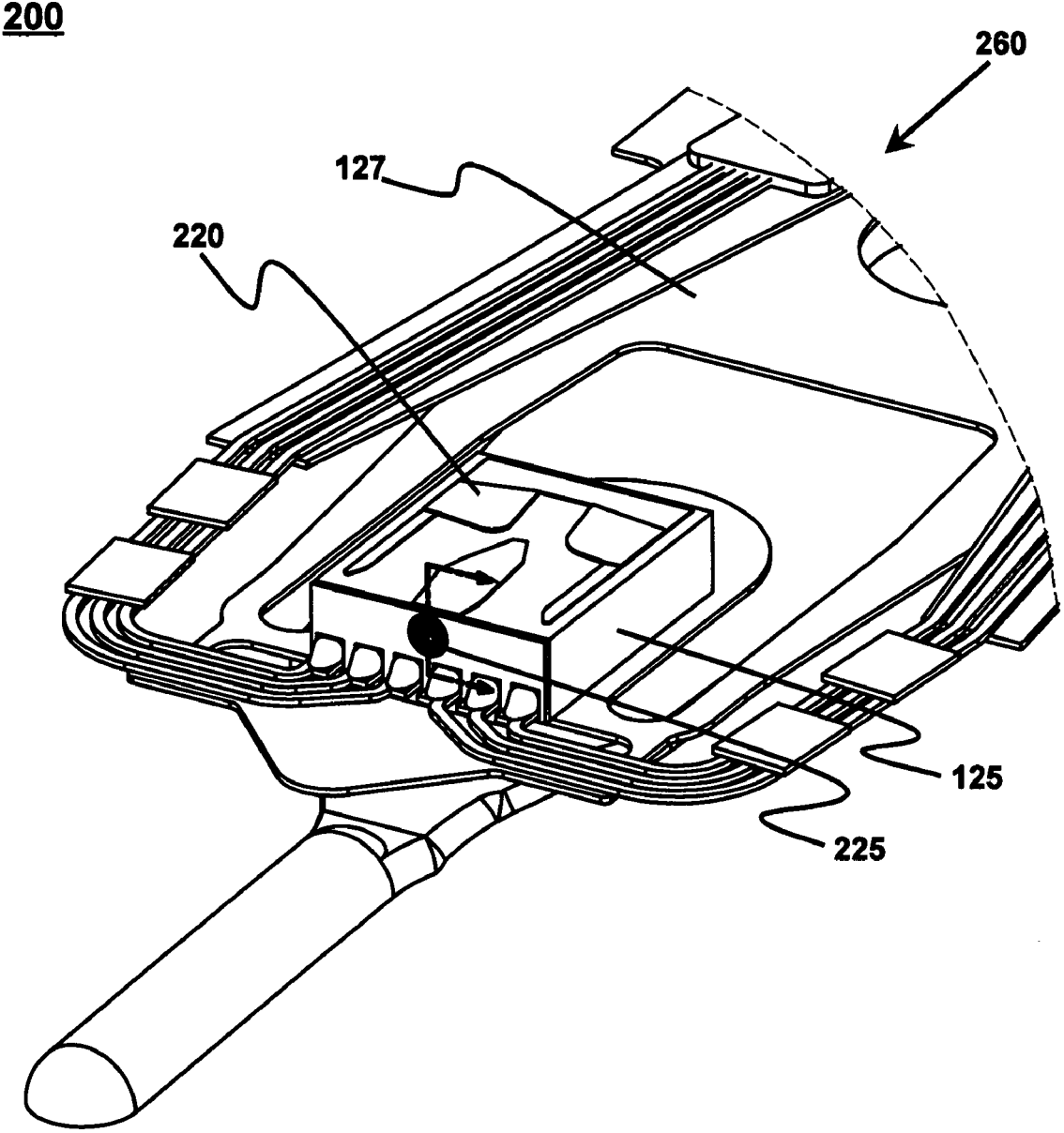
FIG. 2 is an isometric detail of a hard disk drive slider in accordance with one embodiment of the present invention.

With reference to FIG. 2, an isometric detail 200 of HGA 260 is presented in accordance with an embodiment of the present invention. Detail 200 is the most distal end of HGA 260 comprising suspension 127 and HDD slider 125. Slider 125 comprises magnetic transducer 225, which writes and reads data tracks 135 onto disk surface 130, and air-bearing surface (ABS) 220, which in cooperation with suspension 127 provides a proper balance of forces, whereby magnetic transducer 225 is closely spaced from disk surface 130 by a film of air.

Figure 3:
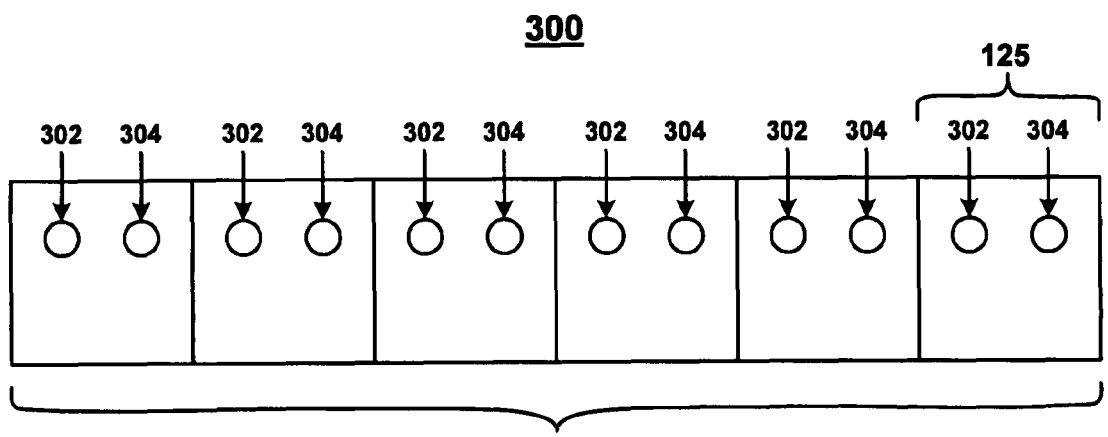
FIG. 3 is a block diagram of an exemplary bar containing a plurality of slider assemblies shown in accordance with one embodiment of the present invention.

With reference now to FIG. 3, a block diagram of an exemplary bar 300 of a plurality of slider assemblies 125 is shown. As shown in FIG. 3, in one embodiment, each of the slider assemblies 125 includes a write head 302 and read head 304 which form the magnetic transducer 225. For example, slider assemblies 125 will be formed at the wafer level and then the bars of the wafer will be separated into a plurality of bars 300.

Figure 4A:
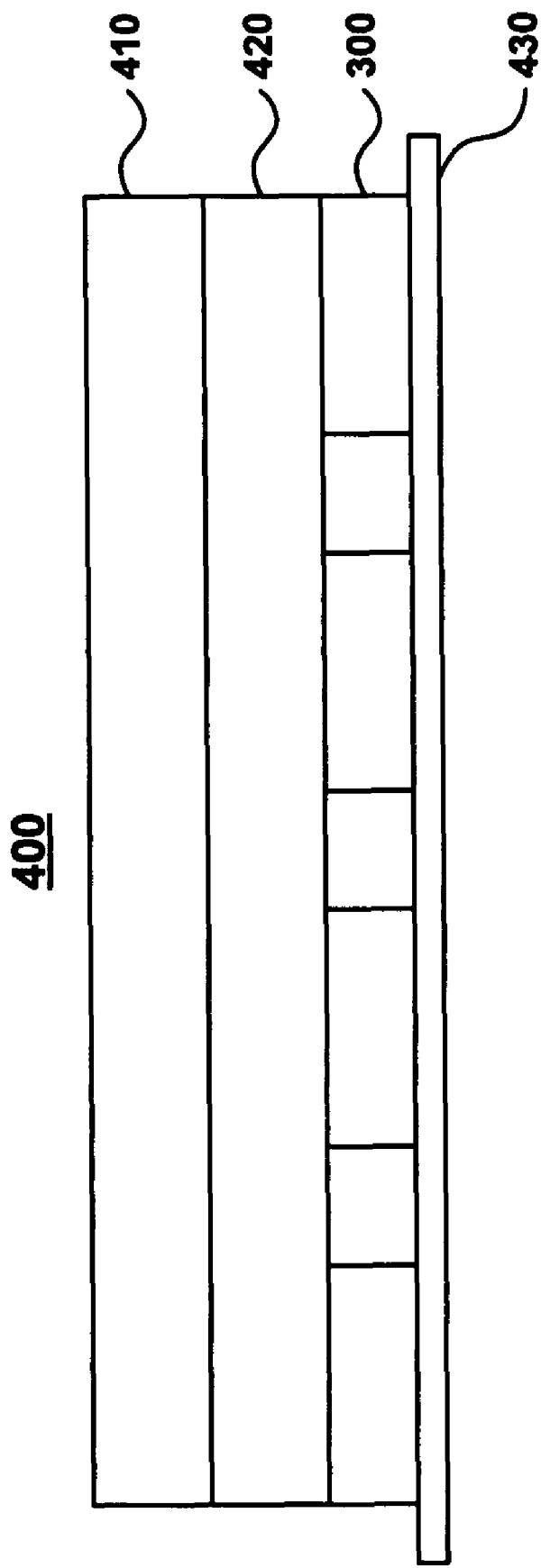
FIG. 4A is a block diagram of a plurality of bars containing a plurality of slider assemblies having a solid single thermoplastic layer thereover in accordance with one embodiment of the present invention.

With reference now to FIG. 4A, a block diagram 400 of a plurality of bars 300 containing a plurality of slider assemblies having a solid single thermoplastic layer 420 thereover is shown in accordance with one embodiment of the present invention. In one embodiment, diagram 400 also includes a hot press 410 and an adhesive layer 430. Adhesive layer 430 may be an adhesive tape such as Riston™, 3M615™, or the like.

Figure 4B:
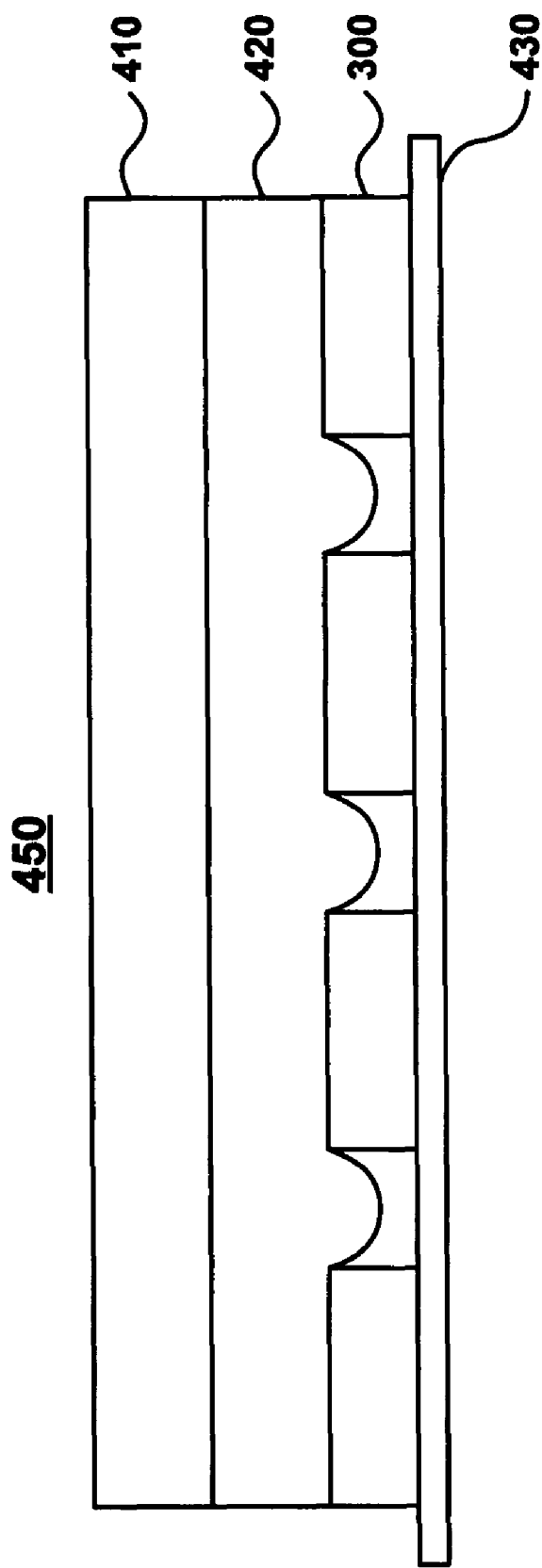
FIG. 4B is a block diagram of a plurality of bars containing a plurality of slider assemblies having a flowing single thermoplastic layer therearound in accordance with one embodiment of the present invention.

Referring now to FIG. 4B, a block diagram 450 of a plurality of bars 300 containing a plurality of slider assemblies having a flowing single thermoplastic layer 420 therearound is shown in accordance with one embodiment of the present invention. Basically, at diagram 450, single thermoplastic layer 420 is heated to a flow temperature and begins to flow.

For example, in one embodiment, hot press 410 is used to deliver the heat to single thermoplastic layer 420. However, in another embodiment, the entire assembly is placed in a vacuum hot press chamber and the entire assembly is heated to the flow temperature of single thermoplastic layer 420.

Figure 4C:
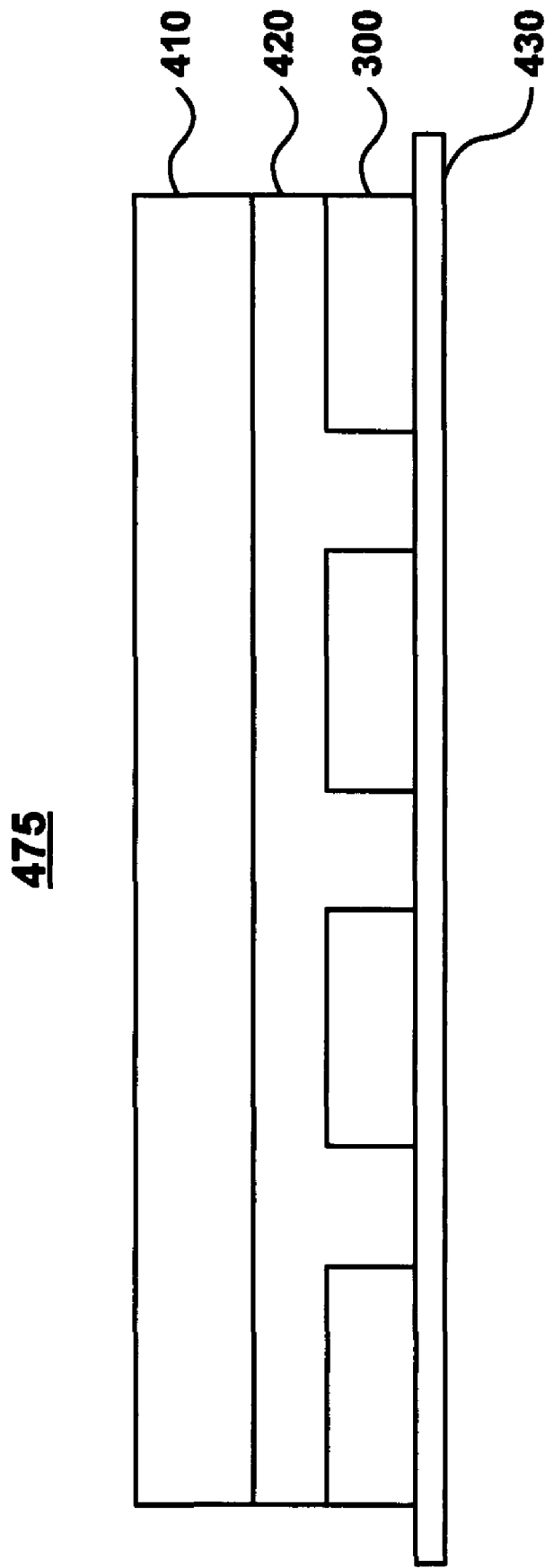
FIG. 4C is a block diagram of a plurality of bars containing a plurality of slider assemblies having a solid single thermoplastic layer forming a planarized surface in accordance with one embodiment of the present invention.

With reference now to FIG. 4C, a block diagram 475 of a plurality of bars 300 containing a plurality of slider assemblies having a solid single thermoplastic layer 420 forming a planarized surface is shown in accordance with one embodiment of the present invention. In other words, at diagram 475, single thermoplastic layer 420 has finished flowing and is cooled until single thermoplastic layer 420 returns to a solid.

For example, in one embodiment, single thermoplastic layer 420 is cooled by turning off hot press 410. However, in another embodiment, the entire assembly within the vacuum hot press chamber is cooled to the solidifying temperature of single thermoplastic layer 420. Further detail is provided in the following description of flowchart 500.

With reference now to FIG. 5, a flowchart 500 illustrates one embodiment of a method for forming a planarized surface for at least one bar of sliders for utilization in a hard disk drive. As stated herein, the planarized surface is important for the step of forming ABS 220 on slider assembly 125.

Referring now to 502 of FIG. 5 and to FIG. 4A, according to one embodiment, place at least one bar 300 of slider assemblies 125 on an adhesive layer 430. For example, bar 300 is placed on adhesive layer 430 such that an air bearing surface of the at least one bar 300 is directly coupled with adhesive layer 430.

With reference now to 504 of FIG. 5 and to FIG. 4A, according to one embodiment, place a single thermoplastic layer 420 above bar 300 of slider assemblies 125. That is, in one embodiment, there is no additional layer of material between bars 300 and single thermoplastic layer 420. In one embodiment, single thermoplastic layer 420 is an ethylene-vinyl acetate copolymer. For example, the ethylene-vinyl acetate (EVA) copolymer is an EVA class material such as Dow Integral 801, Bemis 6218 or the like.

Referring now to 506 of FIG. 5 and to FIG. 4B, according to one embodiment, heat single thermoplastic layer 420 to a softening temperature such that single thermoplastic layer 420 will flow between bars 300. For example, in one embodiment, the softening temperature is approximately 92° C. However, it is appreciated that a number of possible single thermoplastic layer 420 materials may be used and that each may have a different softening temperature. According to one embodiment, utilize a vacuum hot press chamber to heat single thermoplastic layer 420 to a softening temperature. Moreover, in one embodiment, the vacuum hot press chamber reduces the sub-ambient pressure around bars 300. For example, the pressure may be reduced for approximately 0-10 minutes to drive the air out of the gaps between bars 300.

Furthermore, one embodiment may utilize hot press 410 to provide a downward pressure to single thermoplastic layer 420 during the heating. In one embodiment, the downward pressure is exerted by said hot press 410. Moreover, in another embodiment, the vacuum hot pressure chamber may not be used for heating and instead, hot press 410 may be used to provide the heat to cause single thermoplastic layer 420 to flow. For example, hot press 410 may be applied to single thermoplastic layer 420 with a pre-set temperature of approximately 140°-160° C. Thus, upon contact with hot press 410 single thermoplastic layer 420 will be heated above its softening temperature and will start to flow toward adhesive layer 430 and around bars 300. Moreover, if a vacuum hot press chamber is being utilized, a pressure such as approximately 40 psi may be provided in the vacuum to assist the flow of single thermoplastic layer 420.

With reference now to 508 of FIG. 5 and to FIG. 4C, according to one embodiment, cool single thermoplastic layer 420 to form a planarized surface of both single thermoplastic layer 420 and bars 300 at adhesive layer 430. For example, as stated herein, in one embodiment, single thermoplastic layer 420 is cooled by turning off hot press 410. However, in another embodiment, the entire assembly within the vacuum hot press chamber is cooled to the solidifying temperature of single thermoplastic layer 420.

For example, in one embodiment, hot press 410 is removed from single thermoplastic layer 420, vacuum hot press chamber is vented and the entire assembly 475 is placed on a cooling block. In one embodiment, the assembly 475 is placed on the cooling block ABS side down (e.g., adhesive 430 side) to cool assembly 475 from the ABS side to prevent single thermoplastic layer 420 shrinkback. Thus, single thermoplastic layer 420 only needs to cool to return to a solid form. There is no longer a need to UV cure or otherwise cure single thermoplastic layer 420, it will simply return to solid state when it cools. Moreover, because there is no need to cure single thermoplastic layer 420, the assembly 475 can easily be re-planarized at any time.

Once single thermoplastic layer 420 has hardened, adhesive layer 430 can be removed and a planarized surface of both bars 300 and single thermoplastic layer 420 is exposed. The bars 300 can then be etched or otherwise shaped as desired. For example, in one embodiment, the bars 300 include a plurality of slider assemblies 125 and ABS 220 of the slider assemblies 125 can be formed. Moreover, after the formation of the ABS 220 in slider assemblies 125, single thermoplastic layer 420 is easily removed with the use of non-polar solvents.

In addition, because single thermoplastic layer 420 is soluble to non-polar solvents, the solvent used on single thermoplastic layer 420 will not adversely affect bars 300 or the ABS 220 thereon. For example, single thermoplastic layer 420 may be removed with the use of non-polar solvents such as, but not limited to, SoyGold 1000™, Exxon Aromatic 200ND™, Mesitylene™, bio-diesel, and the like. Moreover, because single thermoplastic layer 420 is soluble to non-polar solvents, polar solvents may be used to remove adhesive layer 430 or photoresist residues without detrimentally effecting either single thermoplastic layer 420 or bars 300.

Also, because single thermoplastic layer 420 is soluble, there is no need for soda blast or other types of aggressive cleaning of bars 300. That is, single thermoplastic layer 420 is dissolved by the non-polar solvent and will leave no residue. In other words, the present technology utilizes non-polar solvent to remove single thermoplastic layer 420 from the at least one bar 300 without requiring the use of a soda blast process or similar aggressive mechanical cleaning procedures.

Thus, the present invention, in the various embodiments provides a method for forming a planarized surface for at least one bar of sliders. Moreover, the present technology provides a method for forming a planarized surface for at least one bar of sliders which utilizes only a single layer of thermoplastic material. Furthermore, the present technology provides a method for forming a planarized surface for at least one bar of sliders which can be removed with the use of non-polar solvents which will not detrimentally affect the bar of sliders, thereby significantly reducing the number of steps required in the planarization process.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments described herein were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A bar of sliders surface planarizer comprising:
   an adhesive layer provider for placing an adhesive layer for coupling with at least one wafer bar, said at least one wafer bar comprising a plurality of slider assemblies formed thereon, each of said slider assemblies comprising a read head and a write head;
   a single thermoplastic layer provider for placing said single thermoplastic layer above said at least one wafer bar comprising a plurality of slider assemblies;
   a heat system for heating said single thermoplastic layer to a softening temperature;
   a press for providing a downward pressure to said single thermoplastic layer such that said single thermoplastic layer will flow between said at least one wafer bar comprising a plurality of slider assemblies; and
   a cooling apparatus for cooling said single thermoplastic layer to form a planarized surface of both said single thermoplastic layer and said at least one wafer bar comprising a plurality of slider assemblies at said adhesive layer.

2. The bar of sliders surface planarizer of claim 1 wherein said at least one wafer bar comprising a plurality of slider assemblies is placed on said adhesive layer such that an air bearing surface of said at least one wafer bar comprising a plurality of slider assemblies is directly coupled with said adhesive layer.

3. The bar of sliders surface planarizer of claim 1 wherein said thermoplastic material comprises an ethylene-vinyl acetate copolymer.

4. The bar of sliders surface planarizer of claim 1 wherein said heat system utilizes a vacuum hot press chamber to heat said single thermoplastic layer to a softening temperature.

5. The bar of sliders surface planarizer of claim 4 wherein said vacuum hot press chamber reduces the sub-ambient pressure around said at least one wafer bar comprising a plurality of slider assemblies.

6. The bar of sliders surface planarizer of claim 1 wherein said press is heated thereby providing both heat and a downward pressure to said single thermoplastic layer.

7. The bar of sliders surface planarizer of claim 1 further comprising:
    a non-polar solvent provider for providing a non-polar solvent to remove said thermoplastic layer from said at least one wafer bar comprising a plurality of slider assemblies without requiring the use of a soda blast process.

\* \* \* \* \*